United States Patent
Chen et al.

(10) Patent No.: US 10,091,473 B1
(45) Date of Patent: Oct. 2, 2018

(54) DRIVER CIRCUIT HAVING LIGHT SOURCE DRIVER AT PRIMARY SIDE

(71) Applicant: QISDA CORPORATION, Taoyuan (TW)

(72) Inventors: Chi-Jen Chen, Taoyuan (TW); Chun-Hsiao Lin, Taoyuan (TW); Fang-Chieh Lu, New Taipei (TW); Chuan-Chu Chen, Taoyuan (TW)

(73) Assignee: Qisda Corporation, Taoyuan (TW)

( * ) Notice: Subject to any disclaimer, the term of this patent is extended or adjusted under 35 U.S.C. 154(b) by 0 days.

(21) Appl. No.: 15/704,009

(22) Filed: Sep. 14, 2017

(30) Foreign Application Priority Data

Aug. 30, 2017 (CN) .......................... 2017 1 0759350

(51) Int. Cl.
*H04N 9/31* (2006.01)
*G03B 21/00* (2006.01)

(52) U.S. Cl.
CPC ......... *H04N 9/3155* (2013.01); *G03B 21/006* (2013.01); *G03B 21/008* (2013.01)

(58) Field of Classification Search
CPC ................................................. G09G 2330/02
USPC ....................................................... 348/751
See application file for complete search history.

(56) References Cited

U.S. PATENT DOCUMENTS

| | | | |
|---|---|---|---|
| 7,319,600 B2* | 1/2008 | Lee | G09G 3/36 363/21.02 |
| 9,872,153 B2* | 1/2018 | Zampini, II | H04W 4/043 |
| 2004/0145584 A1* | 7/2004 | Lee | G09G 3/36 345/212 |
| 2009/0015068 A1* | 1/2009 | Lee | G09G 3/36 307/31 |
| 2009/0021183 A1* | 1/2009 | Ye | G09G 3/342 315/291 |
| 2016/0127875 A1* | 5/2016 | Zampini, II | H04W 4/043 370/311 |
| 2017/0013417 A1* | 1/2017 | Zampini, II | H04W 4/043 |

* cited by examiner

*Primary Examiner* — Paulos M Natnael

(57) ABSTRACT

A driver circuit includes a first voltage converter, a light source driver, a second voltage converter and a control circuit. The first voltage converter converts a first voltage to a second voltage. The light source driver is coupled to the first voltage converter, converts the second voltage to a third voltage and outputs the third voltage to a light source for providing light. The second voltage converter is coupled to the first voltage converter, converts the second voltage to a fourth voltage and outputs the fourth voltage. The control circuit is coupled to the second voltage converter to receive the fourth voltage and outputs a first control signal to control the light source driver for controlling the light source. The first voltage is lower than the second voltage, the second voltage is higher than the third voltage, and the second voltage is higher than the fourth voltage.

16 Claims, 6 Drawing Sheets

DRIVER CIRCUIT HAVING LIGHT SOURCE DRIVER AT PRIMARY SIDE

BACKGROUND OF THE INVENTION

1. Field of the Invention

The present invention relates to a driver circuit, and in particularly, a driver circuit having a light source driver at a primary side.

2. Description of the Prior Art

Projectors have been widely used for projecting images in classrooms, conference rooms and homes. In a conventional projector, a driver device can drive a light source to provide light for generating images. In a conventional projector, a converter is used to convert electric power from a higher voltage to a lower voltage. The power with the lower voltage can then be supplied to the driver device. FIG. 1 illustrates a controller circuit 100 in a conventional projector according to prior art. In the controller circuit 100, a first voltage converter 110 can receive a first voltage V11 so as to convert the first voltage V11 to a second voltage V12. The first voltage V11 is an alternating current (AC) voltage provided by mains electricity. The second voltage V12 is a direct current (DC) voltage. For example, the first voltage V11 is 220 volts, and the second voltage V12 is set to a high level voltage (e.g. 380 volts) for the requirements of safety testing. A second voltage converter 120 is coupled between the first voltage converter 110 and a driver device 130. The second voltage converter 120 can convert the second voltage V12 to a lower voltage V13. The voltage V13 may be 48 volts. The controller circuit 100 also includes a third voltage converter 140 and a control circuit 150. The voltage converter 140 is coupled to the voltage converter 110 to receive the voltage V12 and used to convert the voltage V12 for providing a fourth voltage V14 to the control circuit 150. The fourth voltage V14 is a DC low voltage such as 12 volts. The control circuit 150 can output control signals to control the driver device 130. The driver device 130 then controls a light source accordingly.

The controller circuit 100 is feasible, but occupies a big area. The second voltage converter 120 is an LLC converter including a set of inductors and at least one capacitor. In order to meet safety standards, the second voltage converter 120 should provide sufficient electrical isolation. To provide the electrical isolation, in the second voltage converter 120, a distance between coils of a primary side and a secondary side should be larger than 8 millimeters. The distance, the inductors and the capacitors cause the second voltage converter 120 to occupy more than 40% of the whole area and makes the controller circuit 100 oversized.

SUMMARY OF THE INVENTION

An embodiment of the present invention provides a driver circuit including a first voltage converter, a light source driver, a second voltage converter and a control circuit. The first voltage converter is used to convert a first voltage to a second voltage, and includes a first terminal for receiving the first voltage and a second terminal for outputting the second voltage. The light source driver is used to convert the second voltage to a third voltage, and includes a third terminal coupled to the second terminal of the first voltage converter and a fourth terminal for outputting the third voltage to a light source for providing light. The second voltage converter is used to convert the second voltage to a fourth voltage, and includes a fifth terminal coupled to the second terminal of the first voltage converter and a sixth terminal for outputting the fourth voltage. The control circuit is coupled to the sixth terminal of the second voltage converter and used to output a first control signal to the light source driver to control the light source. The first voltage is lower than the second voltage, the second voltage is higher than the third voltage, and the second voltage is higher than the fourth voltage.

Another embodiment of the present invention provides a control method used to control a driver circuit. The driver circuit comprises a first voltage converter, a light source driver and a second voltage converter. The control method includes the first voltage converter converting a first voltage to a second voltage, the first voltage converter outputting the second voltage to the light source driver and the second voltage converter via an output terminal of the first voltage converter, the light source driver converting the second voltage to a third voltage, the light source driver outputting the third voltage via an output terminal of the light source driver, and the second voltage converter converting the second voltage to a fourth voltage. The first voltage is lower than the second voltage, the second voltage is higher than the third voltage, and the second voltage is higher than the fourth voltage.

Another embodiment of the present invention provides a projector used to project an image. The projector includes a light source, a first voltage converter, a light source driver, a second voltage converter, a control circuit and an image forming unit. The first voltage converter is used to convert a first voltage to a second voltage. The light source driver is used to convert the second voltage to a third voltage and provide the third voltage to the light source. The second voltage converter is used to convert the second voltage to a fourth voltage. The control circuit is used to receive the fourth voltage and output a first control signal to control the light source driver. The image forming unit is used to process the light to generate the image. The first voltage is lower than the second voltage, the second voltage is higher than the third voltage, and the second voltage is higher than the fourth voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
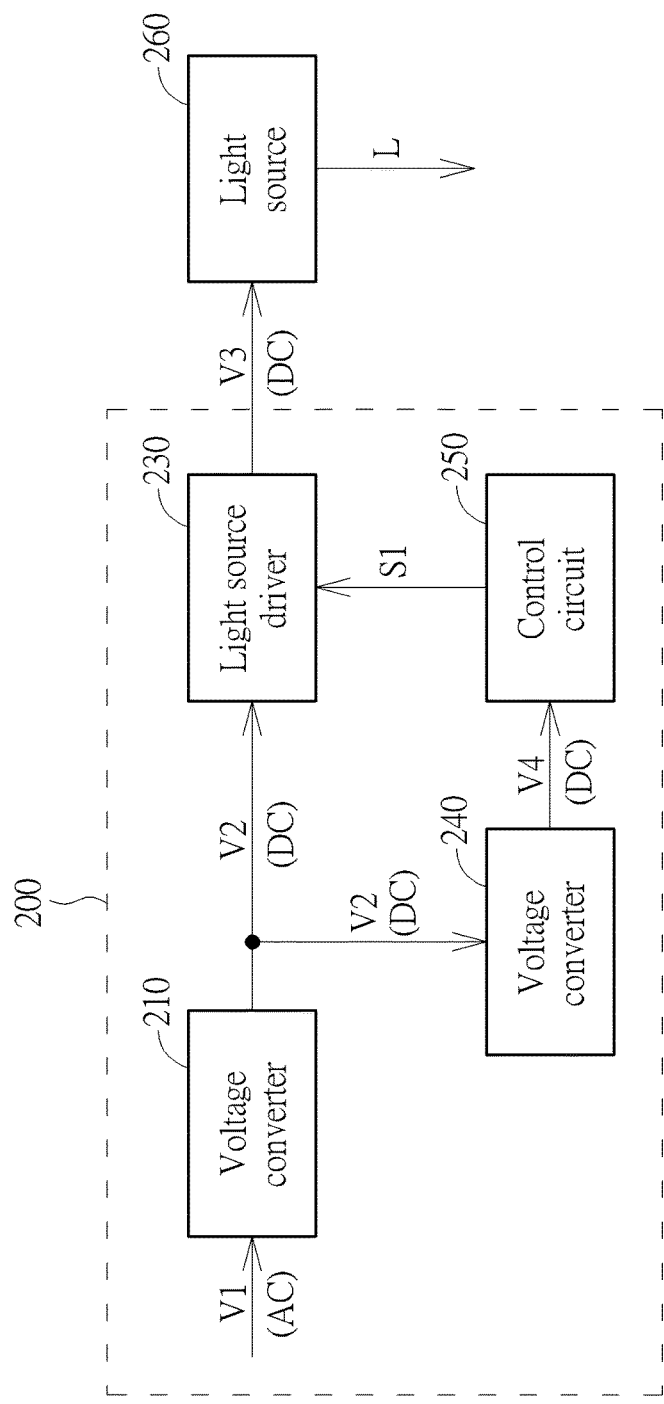
FIG. 2 illustrates a driver circuit according to an embodiment.

FIG. 2 illustrates a driver circuit 200 according to an embodiment. The driver circuit 200 may include a first voltage converter 210, a light source driver 230, a second voltage converter 240 and a control circuit 250. The first voltage converter 210 may convert a first voltage V1 to a second voltage V2, and includes a first terminal for receiving the first voltage V1 and a second terminal for outputting the second voltage V2. For example, the voltage V1 may be an AC voltage provided by mains electricity, and the second voltage V2 can be a DC voltage. For example, the voltage V1 may be 110 or 220 volts, and the voltage V2 may be 380 volts. The light source driver 230 may convert the second voltage V2 to a third voltage V3, and includes a third terminal coupled to the second terminal of the first voltage converter 210 and a fourth terminal for outputting the third voltage V3 to a light source 260 for providing a light L. The third voltage V3 may be a DC voltage lower than the voltage V2. For example, the voltage V3 may be 2 to 370 volts. The voltage converter 240 may convert the second voltage V2 to a fourth voltage V4, and include a fifth terminal coupled to the second terminal of the first voltage converter 210 and a sixth terminal for outputting the fourth voltage V4. The voltage V4 may be a low DC voltage such as 3 or 12 volts. The control circuit 250 may be coupled to the sixth terminal of the second voltage converter 240 and output a first control signal S1 to the light source driver 230 to control the light source 260. According to an embodiment, the first voltage V1 (e.g. 110 or 220 volts, AC) may be lower than the second voltage V2 (e.g. 380 volt, DC), the second voltage V2 may be higher than the third voltage V3 (e.g. 2-370 volts, DC), and the second voltage may be higher than the fourth voltage (e.g. 3 or 12 volts, DC).

The first voltage converter 210 may be a power factor corrector (PFC). The second voltage converter 240 may be a flyback voltage converter. The control circuit 250 may be formed on a main board. The light source 260 may include a laser diode or a light emitting diode, and the light source driver 230 may be a diode driver. According to an embodiment, in the light source driver 230, the included transistor such as the laser driver metal oxide semiconductor field effect transistor (MOSFET) may be selected to be able to operate under a higher voltage (e.g. 600 volts).

Figure 1:
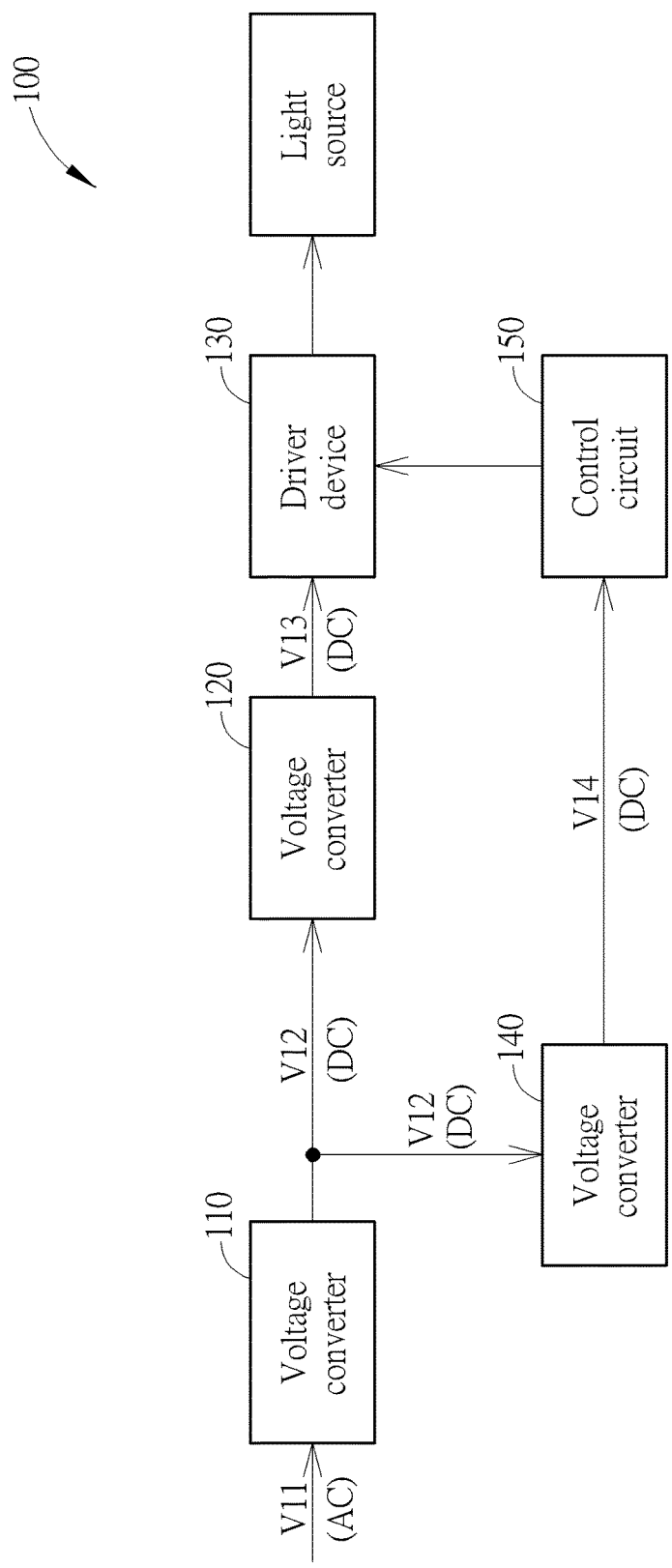
FIG. 1 illustrates a controller circuit in a conventional projector according to prior art.

Comparing FIG. 2 with FIG. 1, the light source driver 230 is at a primary side corresponding to a higher voltage such as the voltage V2 (e.g. 380 volts). As shown in FIG. 2, no electrical isolation has to be implemented between the second terminal (i.e. the output terminal) of the first voltage converter 210 and the fourth terminal (i.e. the output terminal) of the light source driver 230. In other words, by means of the driver circuit 200, the second voltage converter 120 (e.g. an LLC converter) shown in FIG. 1 may be omitted so as to reduce the whole area.

Figure 3:
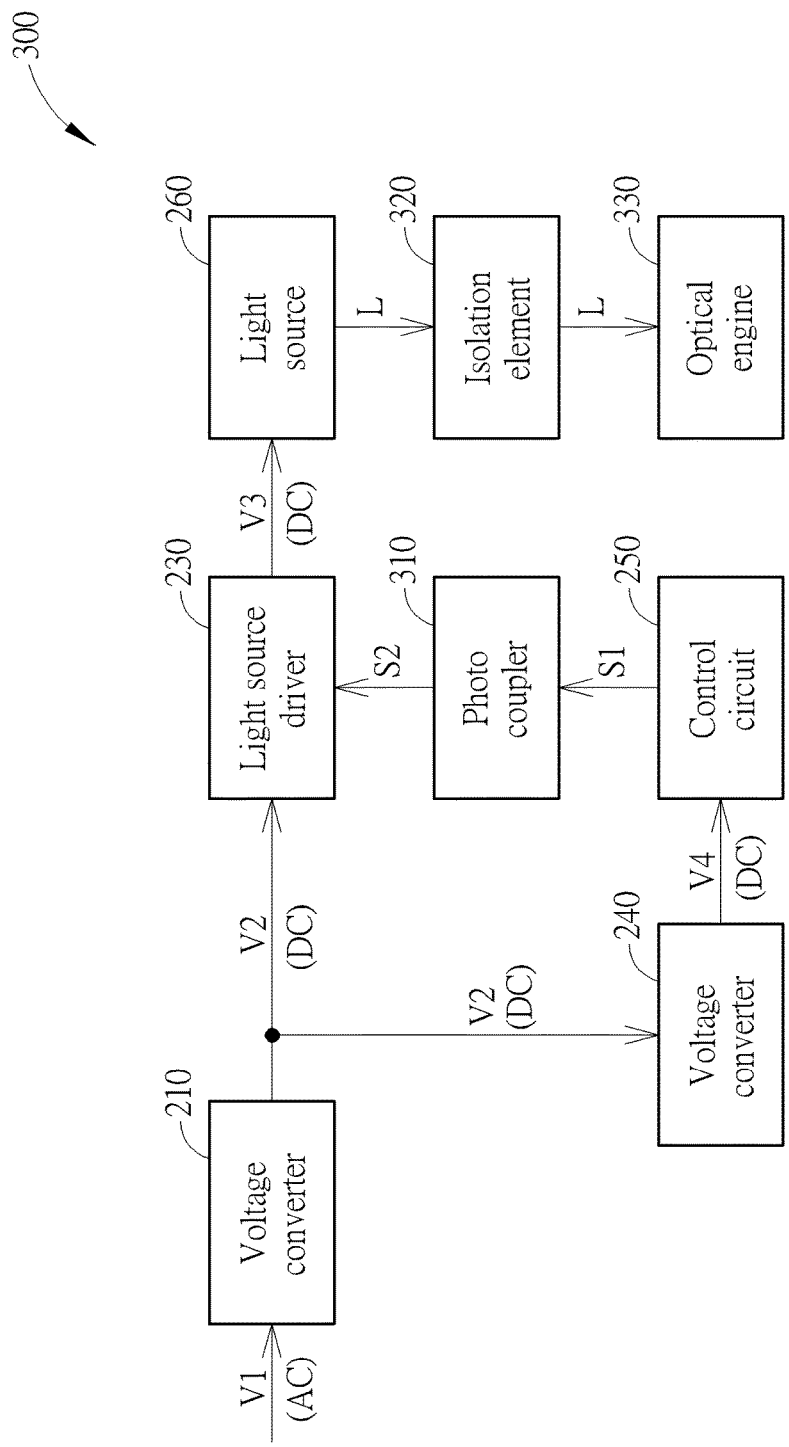
FIG. 3 illustrates a driver circuit according to another embodiment.

FIG. 3 illustrates a driver circuit 300 according to another embodiment. In addition to the components of the driver circuit 200, the driver circuit 300 may further include a photo coupler 310 coupled between the control circuit 250 and the light source driver 230. The photo coupler 310 may provide electrical isolation and generate a second control signal S2 according to the first control signal S1. The light source driver 230 in FIG. 3 may receive the second control signal S2 generated according to the first control signal S1 so as to be controlled by the second control signal S2.

The driver circuit 300 may further include an isolation element 320 and an optical engine 330. The optical engine 330 may process the light L. According to an embodiment, the optical engine 330 may include a set of light reflection elements (e.g. reflection mirrors) and lenses for processing the light L. The isolation element 320 may be coupled between the optical engine 330 and the light source 260 for electrically isolating the optical engine 330 and the light source 260. According to embodiments, the isolation element 320 may include a silicon pad, a ceramic pad, a mica pad or a nonconductive pad.

Figure 4:
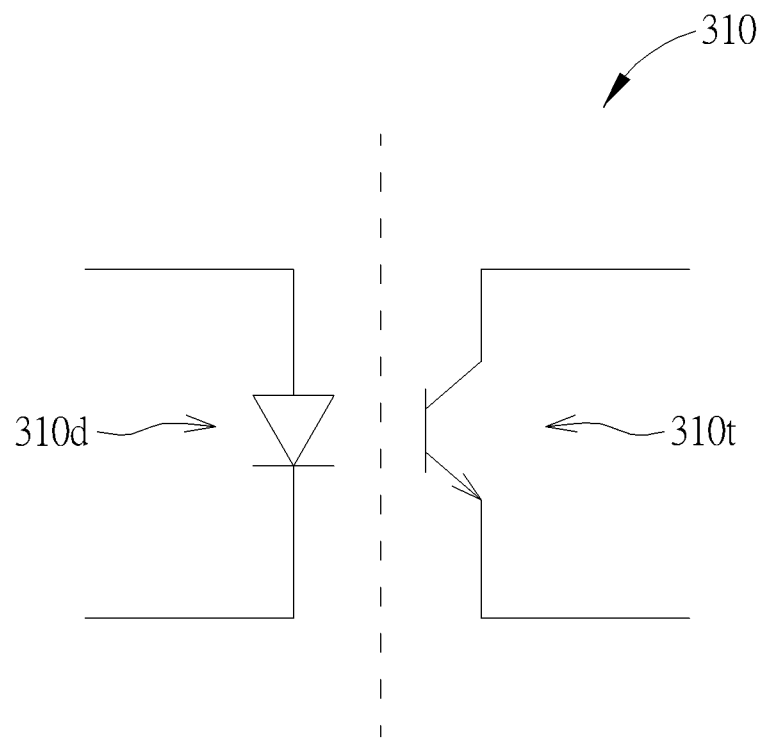
FIG. 4 illustrates the photo coupler according to an embodiment.

FIG. 4 illustrates the photo coupler 310 according to an embodiment. The photo coupler 310 may include a light emitting diode 310$d$ and a phototransistor 310$t$. The light emitting diode 310$d$ and the phototransistor 310$t$ are separated by a distance to provide electrical isolation. FIG. 4 merely illustrates an exemplary structure of the photo coupler 310, other sorts of photo coupler may be used.

The isolation provided by the photo coupler 310 and the isolation element 320 may ensure the safety when a user operating a device including the driver circuit 300.

Figure 5:
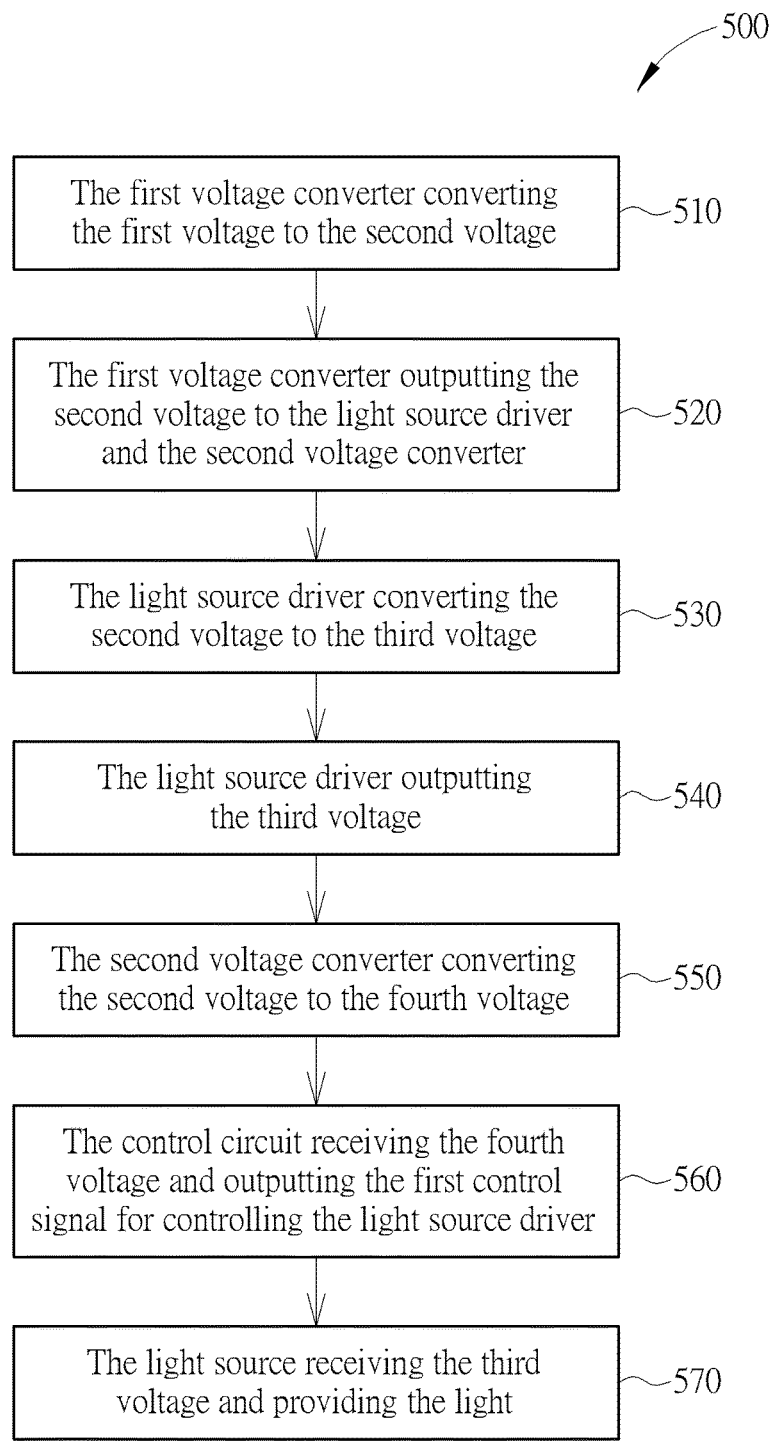
FIG. 5 illustrates a flowchart of a control method according to an embodiment.

FIG. 5 illustrates a flowchart of a control method 500 used to control the driver circuit 200 or 300. The control method 500 may include:

Step 510: the first voltage converter 210 converting the first voltage V1 to the second voltage V2;

Step 520: the first voltage converter 210 outputting the second voltage V2 to the light source driver 230 and the second voltage converter 240 via an output terminal of the first voltage converter 210;

Step 530: the light source driver 230 converting the second voltage V2 to the third voltage V3;

Step 540: the light source driver 230 outputting the third voltage V3 via an output terminal of the light source driver 230;

Step 550: the second voltage converter 240 converting the second voltage V2 to the fourth voltage V4;

Step 560: the control circuit 250 receiving the fourth voltage V4 and outputting the first control signal S1 for controlling the light source driver 230; and Step 570: the light source 260 receiving the third voltage V3 and providing the light L.

According to the embodiment of FIG. 3, when the photo coupler 310 is coupled between the control circuit 250 and the light source driver 230, Step 560 may include that the photo coupler 310 generates the second control signal S2 according to the first control signal S1, and the photo coupler 310 outputs the second control signal S2 to the light source driver 230 for controlling the light source driver 230.

Figure 6:
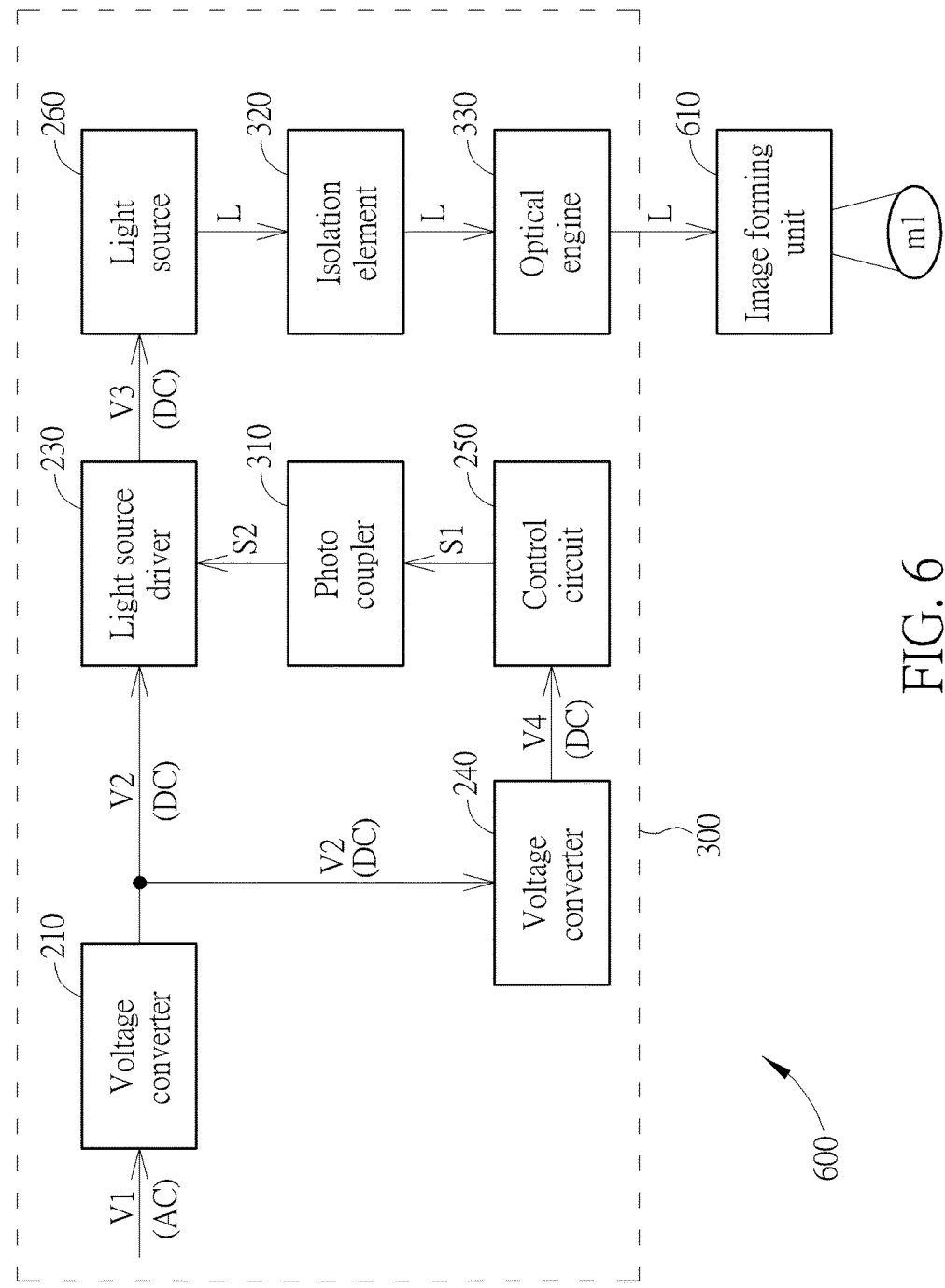
FIG. 6 illustrates a projector according to an embodiment.

FIG. 6 illustrates a projector 600 according to an embodiment. The projector 600 may include the driver circuit 300 and an image forming unit 610 used to process the light L so as to generate a visible image m1. The image forming unit 610 may include a digital micromirror device (DMD) or a liquid crystal display (LCD) panel.

By means of driver circuits, control methods and projectors provided by embodiments, the second voltage converter 120 shown in FIG. 1 can be omitted, so more than 30% the whole circuit area may be eliminated. Moreover, more than 25% of the manufacturing cost may be saved, and the power efficiency may be improved by more than 10%. Hence, the problem of prior art can be alleviated.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A driver circuit comprising:
   a first voltage converter configured to convert a first voltage to a second voltage, comprising:
      a first terminal configured to receive the first voltage; and a second terminal configured to output the second voltage;
a light source driver configured to convert the second voltage to a third voltage, comprising:
a third terminal coupled to the second terminal of the first voltage converter; and
a fourth terminal configured to output the third voltage to a light source for providing light;
a second voltage converter configured to convert the second voltage to a fourth voltage, comprising:
a fifth terminal coupled to the second terminal of the first voltage converter; and
a sixth terminal configured to output the fourth voltage; and
a control circuit coupled to the sixth terminal of the second voltage converter and configured to output a first control signal to control the light source driver to control the light source;
wherein the first voltage is lower than the second voltage, the second voltage is higher than the third voltage, and the second voltage is higher than the fourth voltage,
wherein the light source driver configured to receive a second control signal generated according to the first control signal,
the driver circuit further comprises a photo coupler coupled between the control circuit and the light source driver, and configured to provide electrical isolation and generate the second control signal according to the first control signal.

2. The driver circuit of claim 1, wherein:
no electrical isolation is implemented between the second terminal of the first voltage converter and the fourth terminal of the light source driver.

3. The driver circuit of claim 1, wherein:
the first voltage converter is a power factor corrector;
the second voltage converter is a flyback voltage converter; and
the control circuit is formed on a main board.

4. The driver circuit of claim 1, wherein the photo coupler comprises a light emitting diode and a phototransistor.

5. The driver circuit of claim 1, further comprising:
an optical engine configured to process the light; and
an isolation element coupled between the optical engine and the light source for electrically isolating the optical engine and the light source.

6. The driver circuit of claim 5, wherein the isolation element comprises a silicon pad, a ceramic pad, a mica pad or a nonconductive pad.

7. A control method used to control a driver circuit, the driver circuit comprising a first voltage converter, a light source driver, a second voltage converter, a light source coupled to the light source driver, an optical engine and an isolation element coupled between the optical engine and the light source, the control method comprising:
the first voltage converter converting a first voltage to a second voltage;
the first voltage converter outputting the second voltage to the light source driver and the second voltage converter via an output terminal of the first voltage converter;
the light source driver converting the second voltage to a third voltage;
the light source driver outputting the third voltage via an output terminal of the light source driver;
the second voltage converter converting the second voltage to a fourth voltage;
the light source receiving the third voltage, the light source providing light;
the optical engine processing the light; and
the isolation element electrically isolating the optical engine and the light source;
wherein the first voltage is lower than the second voltage, the second voltage is higher than the third voltage, and the second voltage is higher than the fourth voltage.

8. The control method of claim 7, wherein no electrical isolation is implemented between the output terminal of the first voltage converter and the output terminal of the light source driver.

9. The control method of claim 7, wherein the driver circuit further comprises a control circuit coupled to the second voltage converter, and the control method further comprises:
the control circuit receiving the fourth voltage; and
the control circuit outputting a first control signal to control the light source driver.

10. The control method of claim 9, wherein the driver circuit further comprises a photo coupler coupled between the control circuit and the light source driver, and the control method further comprises:
the photo coupler receiving the first control signal;
the photo coupler generating a second control signal according to the first control signal;
the photo coupler outputting the second control signal to the light source driver to control the light source driver; and
the photo coupler providing electrical isolation between the control circuit and the light source driver.

11. A projector configured to project an image, comprising:
a light source;
a first voltage converter configured to convert a first voltage to a second voltage;
a light source driver configured to convert the second voltage to a third voltage for providing the third voltage to the light source for outputting a light;
a second voltage converter configured to convert the second voltage to a fourth voltage;
a control circuit received the fourth voltage and configured to output a first control signal to control the light source driver;
an image forming unit configured to process the light to the image;
an optical engine configured to process the light; and
an isolation element coupled between the optical engine and the light source for electrically isolating the optical engine and the light source;
wherein the first voltage is lower than the second voltage, the second voltage is higher than the third voltage, and the second voltage is higher than the fourth voltage.

12. The projector of claim 11, wherein the image forming unit comprises a liquid crystal display panel or a digital micromirror device.

13. The projector of claim 11, wherein:
no electrical isolation is implemented between a first node between the first voltage converter and the light source driver and a second node between the light source driver and the light source.

14. The projector of claim 11, wherein:
the projector further comprises a photo coupler coupled between the control circuit and the light source driver, and configured to provide electrical isolation and generate a second control signal provided to the light source driver according to the first control signal.

15. The projector of claim 14, wherein the photo coupler comprises a light emitting diode and a phototransistor.

16. The projector of claim 11, wherein the isolation element comprises a silicon pad, a ceramic pad, a mica pad or a nonconductive pad.

\* \* \* \* \*